(12) United States Patent  
Tschetter et al.

(10) Patent No.: US 7,565,863 B2
(45) Date of Patent: Jul. 28, 2009

(54) GRILL FOR COOKING FOWL

(75) Inventors: Kim R. Tschetter, Cavour, SD (US); Marvis B. Tschetter, Cavour, SD (US)

(73) Assignee: Lankota, Inc., Huron, SD (US)

( * ) Notice: Subject to any disclaimer, the term of this patent is extended or adjusted under 35 U.S.C. 154(b) by 624 days.

(21) Appl. No.: 11/133,551

(22) Filed: May 20, 2005

(65) Prior Publication Data

US 2005/0257693 A1 Nov. 24, 2005

Related U.S. Application Data

(60) Provisional application No. 60/572,850, filed on May 20, 2004.

(51) Int. Cl.
A47J 37/04 (2006.01)
A22C 7/00 (2006.01)

(52) U.S. Cl. .......................................... 99/419; 99/426

(58) Field of Classification Search ........... 99/419–450; 211/181.1, 175, 207–208; D7/409
See application file for complete search history.

(56) References Cited

U.S. PATENT DOCUMENTS

| | | | |
|---|---|---|---|
| 1,969,601 A * | 8/1934 | Foch | 99/419 |
| 3,379,118 A * | 4/1968 | Perez | 99/419 |
| 4,027,583 A | 6/1977 | Spanek et al. | 99/421 |
| D286,498 S | 11/1986 | Rosenkrantz | D7/409 |
| 4,709,626 A | 12/1987 | Hamlyn | 99/426 |
| 4,848,217 A | 7/1989 | Koziol | 99/426 |
| 4,924,768 A | 5/1990 | Jay | 99/425 |
| 5,069,117 A | 12/1991 | Schlessel | 99/419 |
| 5,106,642 A | 4/1992 | Ciofalo | 426/509 |
| 5,301,602 A | 4/1994 | Ryczek | 99/345 |
| 6,062,131 A | 5/2000 | Holland | 99/345 |
| 6,119,585 A | 9/2000 | Guidry | 99/345 |
| 6,119,588 A * | 9/2000 | Tiemann | 99/426 |
| 6,216,586 B1 | 4/2001 | Burgin | 99/339 |
| 6,349,632 B1 | 2/2002 | Beck, Jr. | 99/345 |
| 6,427,582 B1 | 8/2002 | Measom | 99/342 |
| 6,460,452 B1 | 10/2002 | Hester | 99/347 |
| 6,502,503 B1 | 1/2003 | Bell, Jr. et al. | 99/419 |
| 6,503,551 B1 * | 1/2003 | Hester | 426/523 |
| 6,553,896 B1 | 4/2003 | Heide | 99/347 |
| 6,557,460 B2 | 5/2003 | Hester | 99/347 |
| 2002/0195000 A1 | 12/2002 | Hester | 99/345 |
| 2003/0056656 A1 | 3/2003 | Marco, Jr. | 99/345 |

OTHER PUBLICATIONS

Drawings of Lankota product offered for sale prior to May 20, 2003.

* cited by examiner

*Primary Examiner*—Sang Y Paik
(74) *Attorney, Agent, or Firm*—Westman, Champlin & Kelly, P.A.

(57) ABSTRACT

A grill is provided, which includes a substantially planar wire frame and a can holder that is attached to the wire frame and is adapted to hold a liquid container in an upright position. A plurality of skewers extend vertically from the wire frame.

13 Claims, 5 Drawing Sheets

GRILL FOR COOKING FOWL

CROSS-REFERENCE TO RELATED APPLICATION

This application claims the benefit of U.S. Provisional Application 60/572,850 filed on May 20, 2004 for inventors Kim R. Tschetter and Marvis A. Tschetter and entitled GRILL FOR COOKING FOWL.

FIELD OF THE INVENTION

The present invention relates generally to cooking and more particularly to utensils for cooking food, such as fowl and vegetables on an indoor or outdoor grill.

BACKGROUND OF THE INVENTION

Indoor and outdoor grills typically have a grate for supporting food to be grilled above a heat source. When larger food items such as fowl are placed on a grill, it can be difficult to cook the item evenly and to keep the item moist. Also, if other food items are to be roasted with the fowl, each item must be placed individually on the grate and rotated during roasting to prevent burning. Embodiments of the present invention provide solutions to these and other problems, and offer other advantages over the prior art.

SUMMARY OF THE INVENTION

One embodiment of the present invention is directed to a grill, which includes a substantially planar wire frame and a can holder attached to the wire frame and adapted to hold a liquid container in an upright position. A plurality of skewers extend vertically from the wire frame.

Another embodiment of the present invention is directed to a grill, which includes a substantially planar wire frame defined by a plurality of longitudinally and transversely extending bars. First and second can holders are attached to the wire frame and are adapted to hold first and second liquid containers, respectively, in upright positions. Each can holder has a single ring and a plurality of vertically extending bars, which support the ring above the wire frame for receiving the respective liquid container. A plurality of skewers are positioned along a perimeter of the wire frame and extend normal to a plane defined by the wire frame. Each skewer has a vertical riser section and a horizontal section forming an L-shape. The horizontal section extends between a pair of the longitudinally-extending bars and is attached to the pair of the longitudinally-extending bars at opposing ends of the horizontal section.

Another embodiment of the present invention is directed to a grill, which includes a wire frame and a can holder attached to the wire frame and adapted to hold a liquid container in an upright position. First and second skewers extend vertically from the wire frame on opposite sides of the first can holder, for supporting a food item placed over the can holder.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
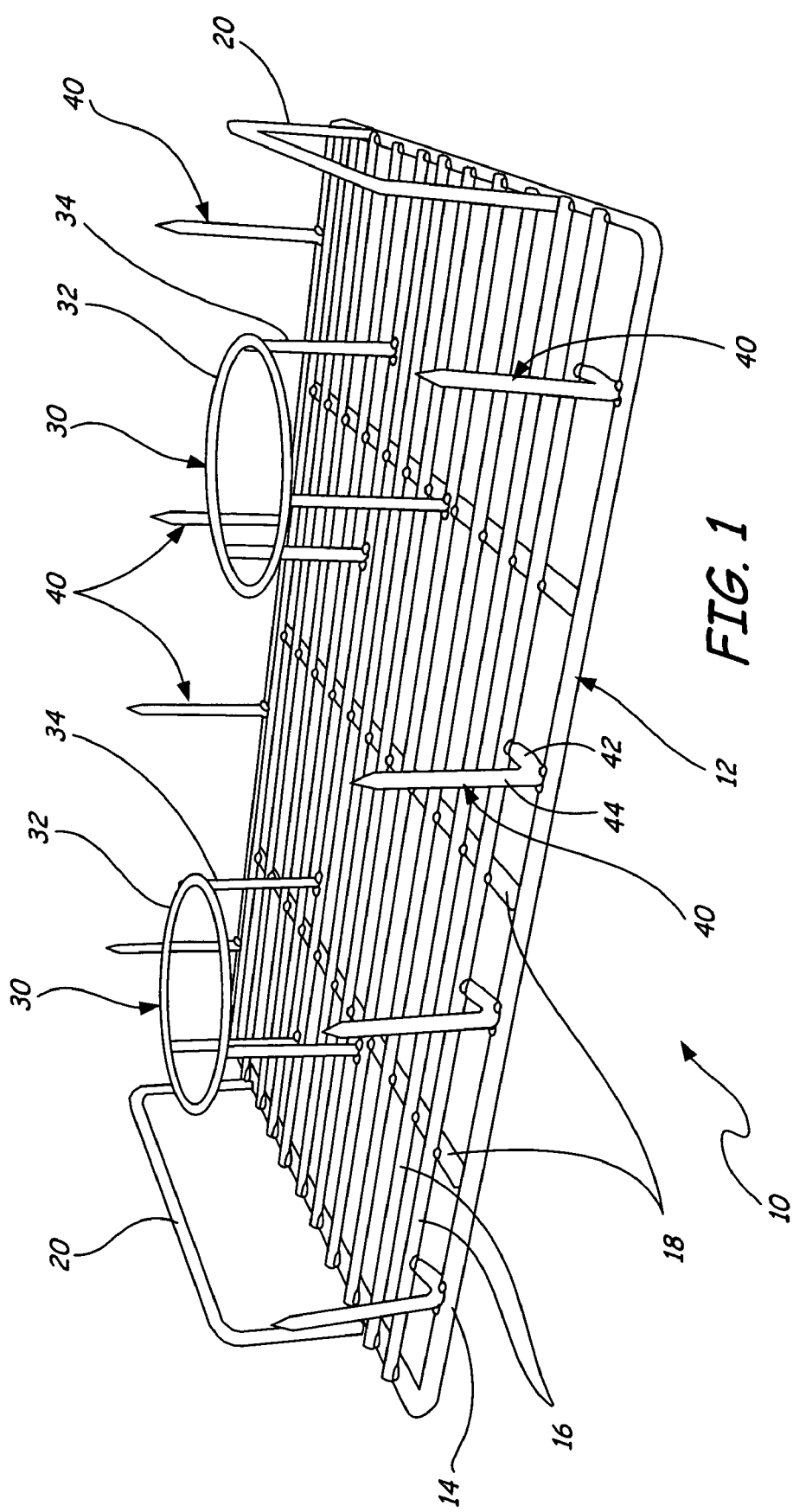
FIG. 1 is a perspective view of a grill for cooking fowl and other food items according to one embodiment of the present invention.
Figure 2:
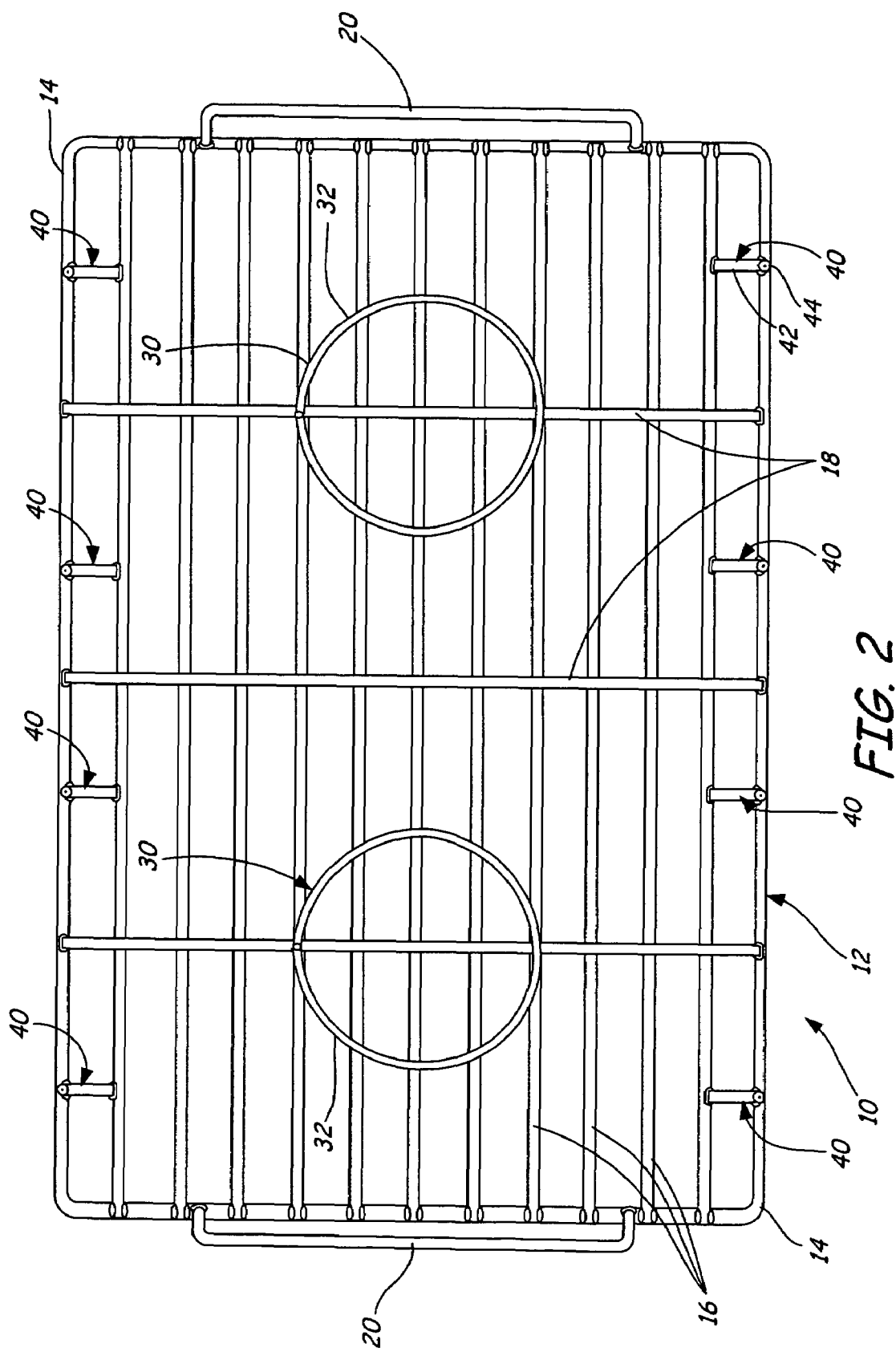
FIG. 2 is a top plan view of the grill shown in FIG. 1.

FIG. 1 is a perspective view of a grill 10 according to one embodiment of the present invention. FIG. 2 is a top plan view of the grill shown in FIG. 1. Looking at FIGS. 1 and 2, grill 10 includes a substantially rectangular grate 12 having a perimeter 14 and a plurality of longitudinally-extending and transversely-extending bars 16 and 18, which are welded or otherwise attached to one another and to perimeter 14 to form a substantially planar wire frame. This wire frame is suitable for supporting grill 10 on an outdoor or indoor grill or oven, for example. The elements of grill 10 can be formed of any suitable material, such as stainless steel or chrome-plated steel rods. Other materials can also be used.

In the embodiment shown in FIGS. 1 and 2, perimeter 14 is defined by a single, continuous bar that is bent to form the rectangular shape of the perimeter. In an alternative embodiment, perimeter 14 can be defined by a plurality of bars attached to one another to form the desired outline shape of grill 10.

Grill 10 further includes a pair of U-shaped handles 20, which are attached to perimeter 14 at opposing ends of grate 12. Two can holders 30 are attached to longitudinal bars 16 and/or transverse bars 18. Each can holder 30 includes a ring 32, which is supported above the wire frame by three vertically-extending bars 34 for receiving a liquid container in the upright position. The vertically-extending bars 34 are welded or otherwise attached to the longitudinal bars 16 (and/or transverse bars 18) of grate 12 and to ring 32.

In one embodiment, the inner diameter of each ring 32 is sized to receive a standard beverage can, such as a soda can or a beer can, in a vertical, upright orientation relative to the surface of grate 12. However, rings 32 can have other diameters or shapes for receiving liquid containers of different types and sizes. The term "can holder" therefore includes any holder that is sized to support a liquid container such as a beverage can or cup, for example.

In FIGS. 1 and 2, can holders 30 are positioned in a central region of grate 12 and are laterally offset from one another. In this example, can holders 30 are laterally offset from one another relative to a midpoint along longitudinal bars 16 and are substantially centered relative to the midpoints of transverse bars 18. Any other number of can holders 30 can be attached to grate 12 in alternative embodiments of the present invention, and these can holders can have various positions on grate 12.

Figure 3:
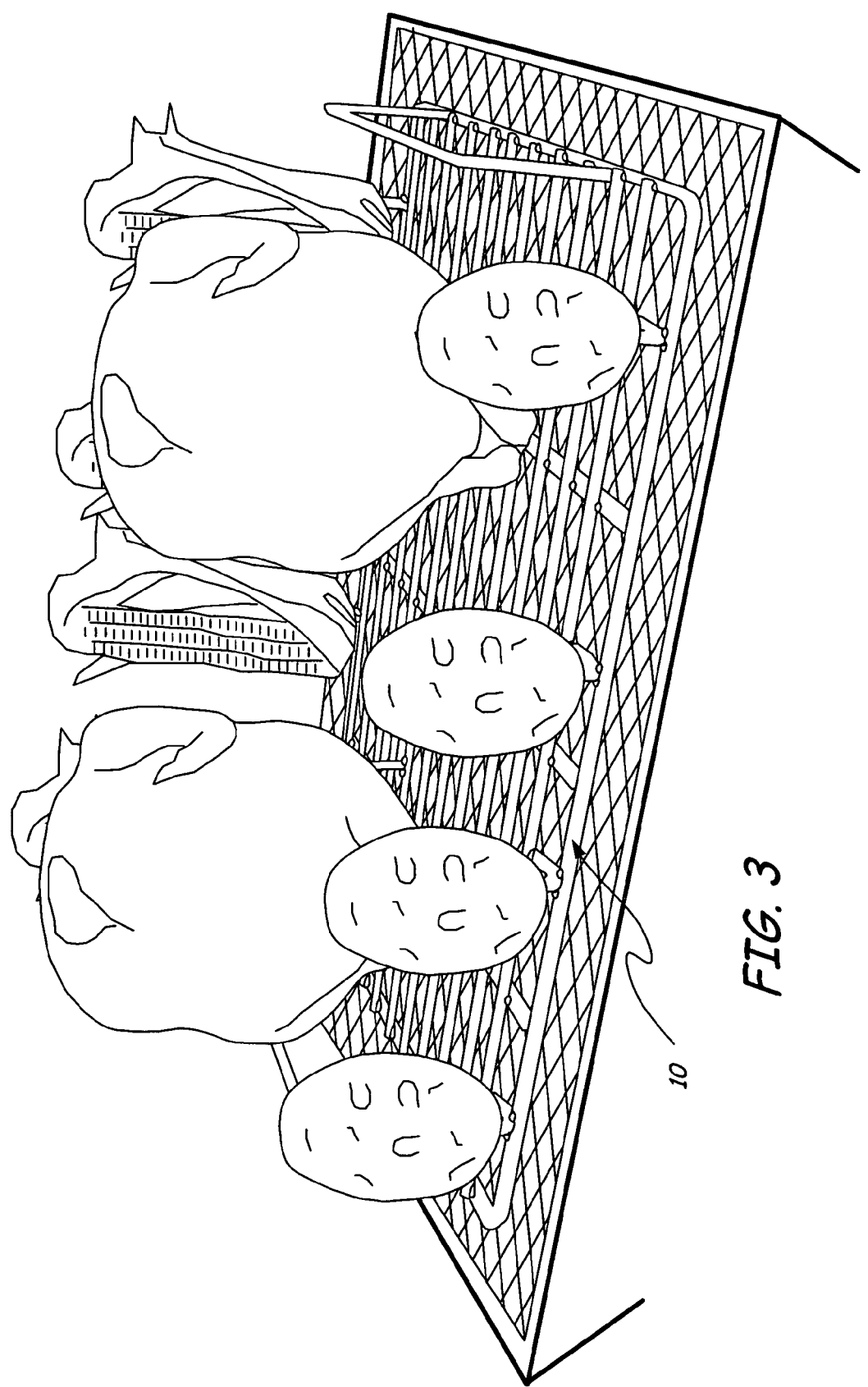
FIG. 3 is a perspective view of the grill supporting two fowl and several vegetables.

During use, an opened beverage can or other liquid container is inserted into one or both of the can holders 30. A fowl is then placed vertically on top of the opened container such that the container and can holder are inserted into the body cavity of the fowl, as shown in FIG. 3. The entire apparatus can then be placed on a grill or in an oven for cooking the fowl. Liquid held within the container assists in keeping the meat of the fowl moist and can add flavoring to the meat.

Referring back to FIGS. 1 and 2, grate 12 further includes a plurality of skewers 40 positioned along perimeter 14. In this embodiment, each skewer 40 is welded to the perimeter 14 and oriented substantially normal to a plane defined by the surface of grate 12. However, skewers 40 can have other angular orientations relative to the surface of grate 12 in alternative embodiments. Each skewer is formed of a rod having an L-shape with a horizontal section 42 and vertical riser section 44. Horizontal section 44 extends between a pair of the longitudinal bars 16 along perimeter 14 and is welded to the pair of bars at opposing ends of the horizontal section. The vertical section 44 of each skewer rod has a tapered point at its apex for facilitating the insertion of the skewer into a food item to be cooked. For example, vegetables such as ears of corn or potatoes can be mounted on skewers 40 for roasting, as shown in FIG. 3. Skewers 40 can also support other types of food items, such as other vegetables and meats. In an alternative embodiment, the ends of transverse bars 18 are extended beyond perimeter 14 and bent upwards to form skewers 40. Skewers 40 can also be formed by single, straight rod sections having a base welded to perimeter 14.

In the embodiment shown in FIGS. 1-2, grate 12 has a first set of four skewers 40 attached to a first side grate 12 and a second set of four skewers 40 attached to a second, opposite side of grate 12. However any other number of skewers can be used, and these skewers can be attached at various other locations along perimeter 14 or anywhere along the longitudinal and/or transverse bars 16 and 18 in alternative embodiments.

Figure 4:
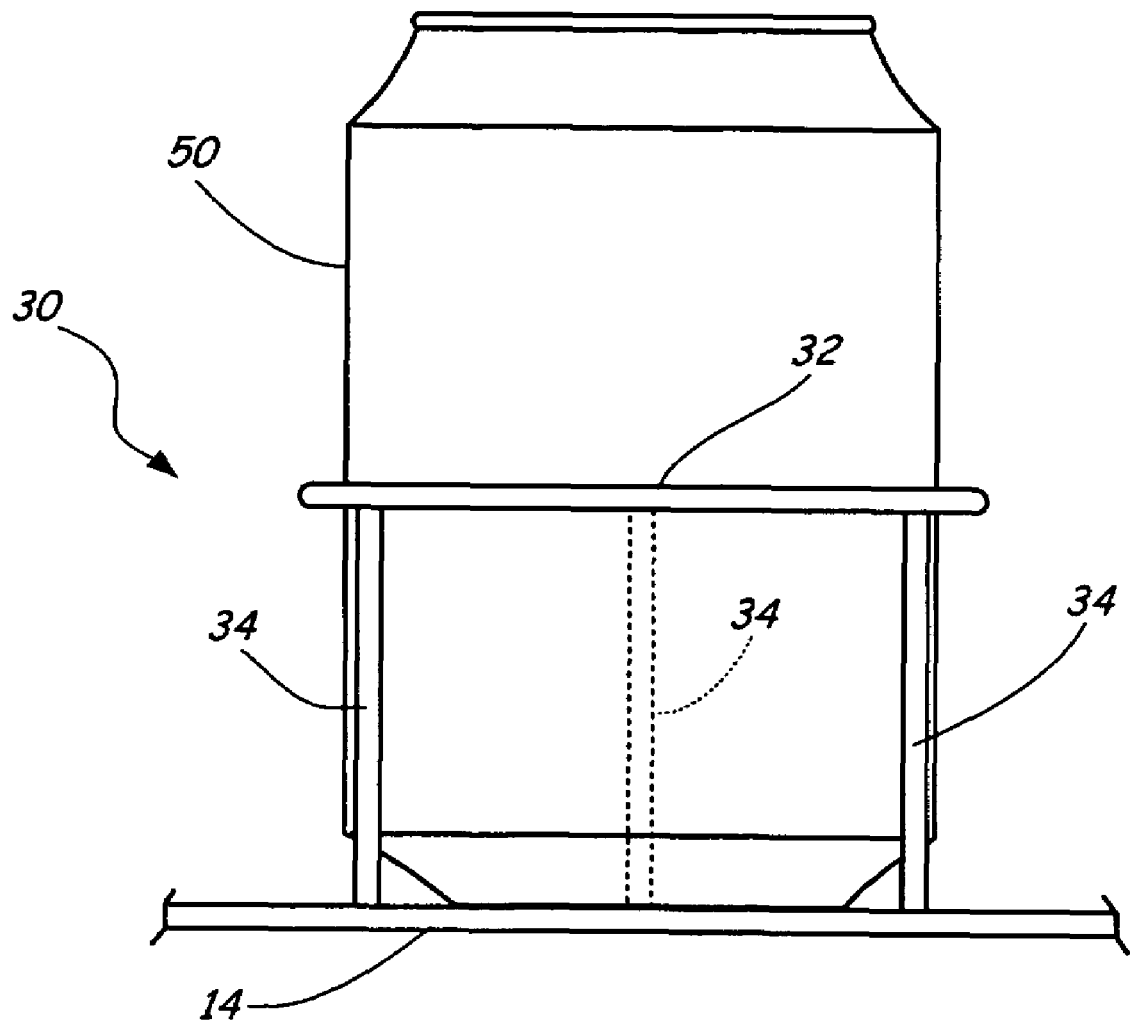
FIG. 4 is a side elevation view of a can holder on the grill shown in FIGS. 1-3.

FIG. 4 is a side view of one of the can holders 30, which illustrates the insertion of a beverage can 50 into the can holder. Beverage can 50 is inserted into holder 30 such that the bottom of the can rests on longitudinal bars 16. Ring 32 holds can 50 in an upright, vertical orientation. In the case of a beverage can, the top of the can is opened to expose the liquid in the can for use in basting the fowl being cooked. The fowl is lowered on to the top of can 50 and can holder 30, such that the can and can holder are inserted into the fowl's body cavity. The combination of the can holder 30 and can 50 support the fowl in an upright position on grate 12, as shown in FIG. 3.

In the embodiment shown in FIGS. 1 and 2, one or two fowl can be cooked at the same time along with any vegetables or other food items on skewers 40. This embodiment is particularly useful for cooking chicken or other fowl of similar size. However, the dimensions of the grate and can holders can be modified to support any type of container or any type of fowl, such as a small duck or a large turkey.

Figure 5:
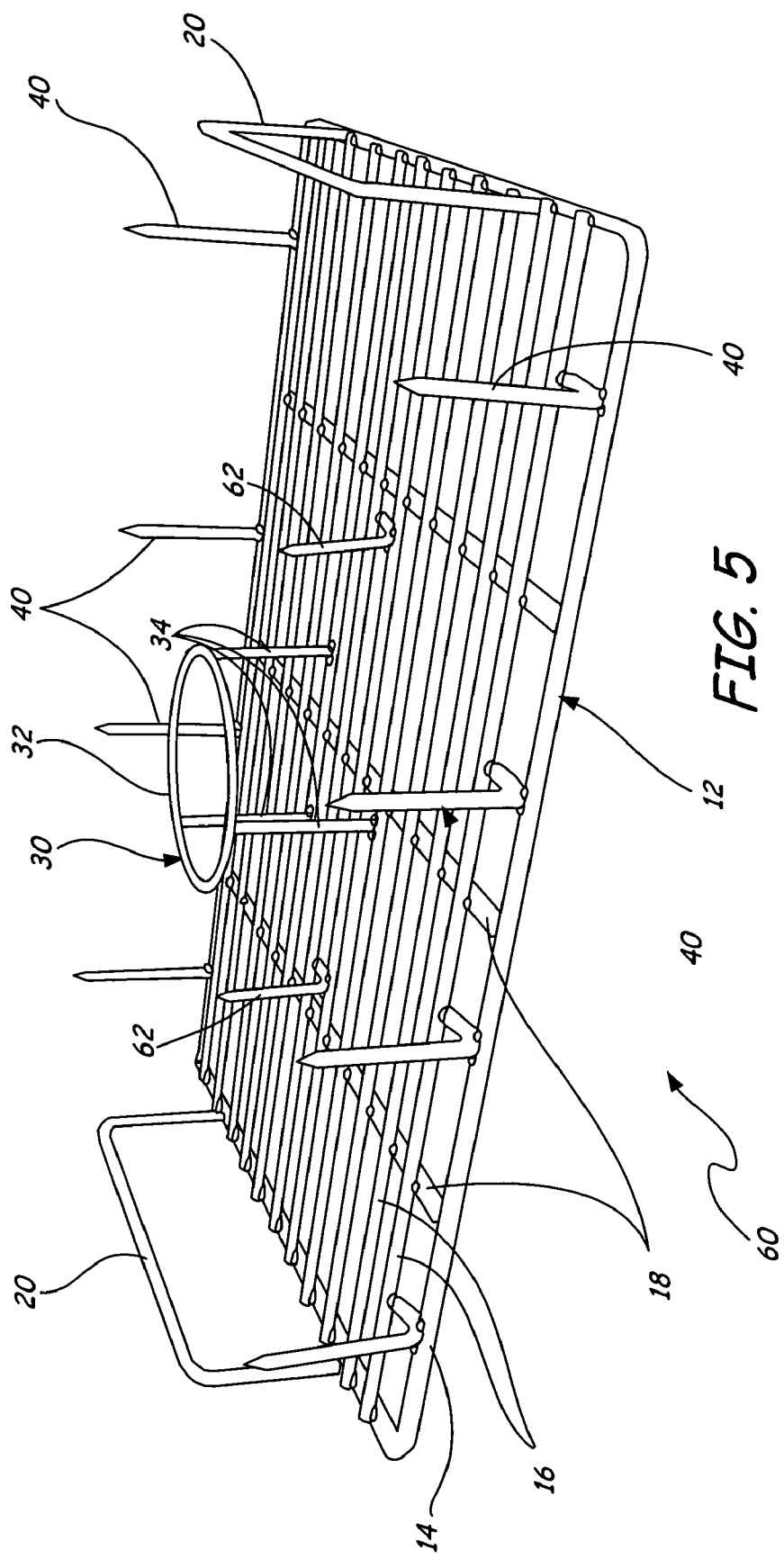
FIG. 5 is a perspective view of a grill for cooking fowl and other food items according to an alternative embodiment of the present invention.

FIG. 5 is a perspective, schematic view of a grill 60 according to an alternative embodiment of the present invention for supporting a larger food item, such as a turkey. The same reference numerals are used in FIG. 5 as were used in FIGS. 1 and 2 for the same or similar elements. In this embodiment, grill 60 includes a single can holder 30 having a ring 32 and three vertical bars 34, which have similar dimensions as those shown in FIGS. 14.

Grill 60 also includes one or more additional skewers 62, which are attached to grate 12 around the periphery of can holder 30. In this embodiment, skewers 62 are positioned on opposite sides of can holder 30 in relative proximity to the can holder for supporting a food item placed over the can holder. For example, skewers 62 can be positioned to engage a typically-sized turkey or other fowl when the fowl is inserted over can holder 30 and pressed downward onto grate 12. Any number of skewers 62 can be used. In one embodiment, skewers 62 are about half as tall as skewers 40. However, skewers 62 can have any desired length. Each skewer 62 has a point formed at its apex for insertion into the meat of the fowl. Skewers 62 can be disposed opposite to one another relative to can holder 62 as shown in FIG. 5 or at other relative locations. In one embodiment, skewers 62 are preferably located within about three inches, and most preferably within about two inches of the outer periphery of can holder 30. Skewers 62 are positioned to assist in helping to stabilize large fowl on grate 12.

In another alternative embodiment, the grill can include one or more can holders with no skewers. In yet another alternative embodiment, the grill can include skewers only and no can holders. Other embodiments also exist.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the grill system while maintaining substantially the same functionality without departing from the scope and spirit of the present invention. In addition, although the preferred embodiment described herein is directed to a grill for cooking fowl it will be appreciated by those skilled in the art that the teachings of the present invention can be applied to other food items, without departing from the scope and spirit of the present invention.

What is claimed is:

1. A grill comprising:
   a substantially planar wire frame;
   a first can holder attached to the wire frame and adapted to hold a liquid container in an upright position;
   first and second skewers extending normal to the plane defined by the substantially planar wire frame, on opposite sides of the first can holder, for engaging and inserting into a food item placed over the can holder, wherein the first and second skewers are shorter than the plurality of further skewers, in a vertical direction;
   a plurality of further skewers positioned along a perimeter of the wire frame and extending vertically from the wire frame.

2. The grill of claim 1 wherein the first and second skewers are located within three inches of an outer periphery of the first can holder.

3. The grill of claim 1 wherein the plurality of further skewers extend normal to the plane defined by the substantially planar wire frame.

4. The grill of claim 1 wherein:
   the wire frame comprises a plurality of longitudinally and transversely extending bars; and
   each of the further skewers comprises a vertical riser section and a horizontal section forming an L-shape, wherein the horizontal section extends between a pair of the longitudinally-extending bars and is attached to the pair of the longitudinally-extending bars at opposing ends of the horizontal section.

5. The grill of claim 4 wherein:
   a first set of the further skewers is attached between a first pair of the longitudinally extending bars, wherein one of the first pair of longitudinally extending bars defines the perimeter of the wire frame along a first side of the wire frame; and
   a second set of the skewers is attached between a second pair of the longitudinally-extending bars, wherein one of the second pair of longitudinally extending bars defines the perimeter of the wire frame along a second, opposite side of the wire frame.

6. The grill of claim 1 wherein the first can holder comprises a single ring and a plurality of vertically extending bars, which support the ring above the wire frame for receiving the liquid container in the upright position.

7. The grill of claim 1 and further comprising a second can holder attached to the wire frame and adapted to hold a further liquid container in an upright position.

8. The grill of claim 7 wherein:
the wire frame comprises a plurality of longitudinally and transversely extending bars; and
the first and second can holders are laterally offset from one another relative to a midpoint along the plural longitudinally extending bars and are substantially centered relative to a midpoint of the transversely extending bars.

9. A grill comprising:
a substantially planar wire frame defined by a plurality of longitudinally and transversely extending bars;
first and second can holders attached to the wire frame and adapted to hold first and second liquid containers, respectively, in upright positions, wherein each can holder comprises a single ring and a plurality of vertically extending bars, which support the ring above the wire frame for receiving the respective liquid container;
a plurality of skewers positioned along a perimeter of the wire frame and extending normal to a plane defined by the wire frame, wherein each skewer comprises a vertical riser section and a horizontal section forming an L-shape, wherein the horizontal section extends between a pair of the longitudinally-extending bars and is attached to the pair of the longitudinally-extending bars at opposing ends of the horizontal section; and at least one additional skewer extending vertically from the wire frame externally from the first can holder in relative proximity, for supporting a food item placed over the can holder, wherein the at least one additional skewer is shorter than the plurality of skewers and located within three inches of an outer periphery of the first can holder.

10. The grill of claim 9 wherein:
a first set of the skewers is attached between a first pair of the longitudinally extending bars, wherein one of the first pair of longitudinally extending bars defines a perimeter of the wire frame along a first side of the wire frame; and
a second set of the skewers is attached between a second pair of the longitudinally-extending bars, wherein one of the second pair of longitudinally extending bars defines the perimeter of the wire frame along a second, opposite side of the wire frame.

11. The grill of claim 9 wherein:
the first and second can holders are laterally offset from one another relative to a midpoint along the plural longitudinally extending bars and are substantially centered relative to a midpoint of the transversely extending bars.

12. The grill of claim 9 wherein the at least one additional skewer comprises:
first and second additional skewers extending vertically from the wire frame on opposite sides of the first can holder in relative proximity, for supporting a food item placed over the can holder.

13. The grill of claim 12 wherein both the first and second additional skewers are shorter than the plurality of skewers and are located within three inches of the outer periphery of the first can holder.

* * * * *